J. W. Grogan.
Door Knob.
Nº 100,026.  Patented Feb. 22, 1870.
Fig. 1.  Fig. 2.
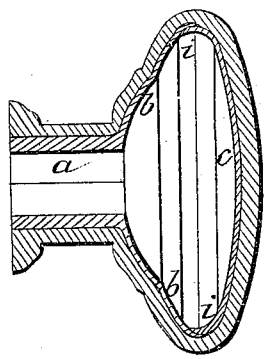
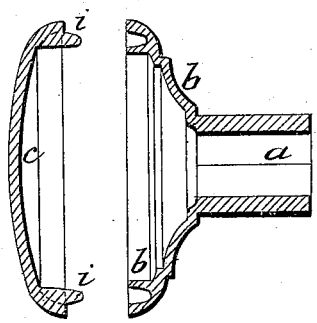
Fig. 3.  Fig. 4.
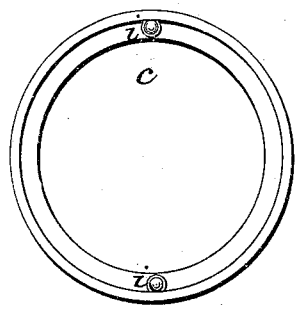
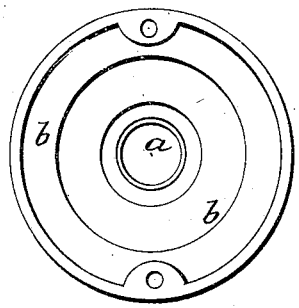
Witnesses  
Geo. D. Walker  
Geo. J. Pinckney
Inventor:  
John W. Grogan

United States Patent Office.

JOHN W. GROGAN, OF BROOKLYN, NEW YORK, ASSIGNOR TO HIMSELF AND JAMES DUFFY, OF SAME PLACE.

Letters Patent No. 100,026, dated February 22, 1870; antedated February 12, 1870.

IMPROVEMENT IN DOOR-KNOBS.

The Schedule referred to in these Letters Patent and making part of the same.

*To all whom it may concern:*

Be it known that I, JOHN W. GROGAN, of Brooklyn, in the county of Kings, and State of New York, have invented and made a new and useful Improvement in Door-Knobs; and I do hereby declare the following to be a full, clear, and exact description of the said invention, reference being had to the annexed drawing making part of this specification, wherein—

Figure 1 is a section of a knob complete for use on a lock or latch-spindle,

Figure 2 is a section of the shells detached,

Figure 3 is a face view of one of the shells, and

Figure 4 is a face view of the other shell.

Similar letters denote the same parts.

This invention relates to a knob that is formed with a surface of white metal in imitation of silver; and The improvement consists in two shells of brass or other metal possessing the requisite strength, and cast or pressed up to shape and united by interlocking clutches, in combination with a covering of white metallic alloy that is cast around the shells of the knob and firmly holds said shells together, at the same time forming a surface metal that can be turned, polished, and burnished to resemble silver.

The knob made in this manner is strong, light, and handsome; its surface is durable and can be cleaned without injury.

The silver-plated knobs for which the present are intended as substitutes are very liable to injury by the plating wearing off by cleaning or handling, and are much more expensive than my aforesaid knob.

In the drawing—

$a$ is the shank of the knob formed with the shell $b$ composing half of the knob.

$c$ is the shell forming the other half of the knob.

These shells are to be made of iron, brass, or other metal that is sufficiently strong and stiff, and the shells $b$ and $c$ are locked together by projections $i$ on one of the shells entering corresponding recesses in the other shell.

If desired, these projections might be in the form of rivets to fasten the parts together, or a bayonet or other locking device may be used to connect the half shells together.

I provide a mould of the size and shape internally that the outside of the knob is required to be, and the shells and mould bear such relation to each other that when the knob is placed within the mould there will be left the necessary space for receiving the melted metal that forms a complete coating around the entire knob and spindle and effectually secures the shells of the knob together.

The mould should be of metal, and the composition or alloy made use of is a white metal imitating silver in color and texture.

The coating metal is to be poured into the mould, and makes a handsome surface to the knob and unites the shells firmly together, and the coating metal is sufficiently thick to allow for the surface being turned and polished or burnished.

What I claim, and desire to secure by Letters Patent, is—

The shells $c$ and $b$, interlocked or connected as specified, and the joint covered and strengthened by the coating metal that surrounds the knob and forms a surface for the same, substantially as set forth.

In witness whereof I have hereunto set my signature this 20th day of April, A. D. 1869.

JOHN W. GROGAN.

Witnesses:
GEO. D. WALKER,
GEO. T. PINCKNEY.